3,790,674
1-(2-PYRIDYL) PIPERAZINE AND LEVODOPA COMPOSITION

Rodolfo Rodriguez, Mexico City, Mexico, assignor to Miles Laboratories, Inc., Elkhart, Ind.
No Drawing. Filed Dec. 21, 1972, Ser. No. 317,113
Int. Cl. A61k 27/00
U.S. Cl 424—250                     17 Claims

ABSTRACT OF THE DISCLOSURE

A composition comprising 1-(2-pyridyl)piperazine and levodopa in a respective weight ratio of from 1:320 to 1:20 controls tremor symptomatic of parkinsonism in mammals. Pharmaceutically acceptable acid addition salts of 1-(2-pyridyl)piperazine can be substituted in lieu of the parent compound in the composition.

BACKGROUND OF THE INVENTION

Field of the invention

Parkinsonism, also referred to as Parkinson's Disease or Parkinson's Syndrome, is a clinical entity of diverse etiology, associated with a variety of pathological processes which involve the extrapyramidal system. In any case, the primary symptom is involuntary tremor. Although the tremor of parkinsonism can be alleviated by neurosurgery, it is most often controlled by chemotherapy. The composition disclosed herein is a pharmaceutical agent for suppressing the tremor symptomatic of parkinsonism.

Description of the prior art

The following compounds, not related to the ingredients of the composition herein disclosed, are used in the chemotherapeutic management of parkinsonism to control tremor: anticholinergic agents such as trihexyphenidyl, biperiden, cycrimine, procyclidine, ethopropazine, and benztropine mesylate; antihistaminic compounds including diphenydramine, chlorphenoxamine, and orphenadrine; and certain belladonna alkaloids, notably atropine and scopolamine. Although these drugs exhibit low toxicity and suppress tremor, only partial control is possible. At high doses, these compounds produce untoward side effects which include dryness of the mouth, blurred vision, photophobia, constipation, urinary retention, and tachycardia. Refer to: Esplin, Don W., "Centrally Acting Muscle Relaxants; Drugs for Parkinson's Disease," in The Pharmacological Basis of Therapeutics, 4th edition, L. S. Goodman and A. Gilman, editors, New York, Macmillan, 1970, chapter 14, pp. 229 to 235.

In recent years, (-)3-(3,4-dihydroxyphenyl)-L-alanine, also known as L-dopa or levodopa, has been utilized to control the tremor of parkinsonism. In order to obtain optimum effectiveness, however, levodopa must be administered in very high doses at which it causes undesirable side effects. Among the latter are: nausea, anorexia, emesis, cardiac irregularities, orthostatic hypotension, choreiform movements, dizziness, sedation, dyskinesia and unpleasant psychiatric symptoms. For details, see Esplin, referenced above, and Physician's Desk Reference, 25th edition, Oradell (N.J.), Medical Economics, Inc., 1970, pp. 692–694 and 1103–1104. The synthesis of levodopa is described in the publication of Yamada et al., Chem. Pharm. Bull., 10: 693 (1962).

The synthesis of 1-(2-pyridyl)piperazine is described by Hamlin et al. in J. Am. Chem. Soc., 71: 2731-2734 (1949) and by Howard et al. in J. Org. Chem., 18: 1484-1488 (1953). In the publication by Howard, 1-(2-pyridyl)piperazine was reported to have no analgesic or antifilarial activity. Although L. W. Roth in J. Pharmac. Exp. Ther., 110: 157–165 (1954) reported the pharmacological activity of a series of substituted piperazines, 1-(2-pyridyl)piperazine was not tested. 1-(2-pyridyl)piperazine is represented by the following structural formula:

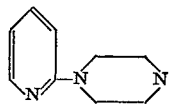

SUMMARY OF THE INVENTION

This invention is a composition, comprising the combination of 1-(2-pyridyl)piperazine (hereinafter referred to as Compound A) and levodopa, for suppressing tremor symptomatic of ideopathic or postencephalic parkinsonism. On a weight basis, the ratio of Compound A to levodopa in the composition can range from 1:320 to 1:20, although 1:80 is preferred. Pharmaceutically acceptable acid addition salts of Compound A can be used in lieu of the parent compound in the composition.

One aspect of this invention is that the antitremor activity of levodopa is increased or potentiated by the concurrent administration of Compound A. Another feature is the discovery that Compound A suppresses tremor symptomatic of parkinsonism and that its antitremor activity is increased or potentiated by levodopa. Combination of amounts of Compound A and levodopa, which are respectively ineffective or marginal antitremor doses, results in a composition which provides activity in excess of the additive effects of both amounts.

Dosages of the composition can range from about 5 mg./kg./day to 20 mg./kg./day.

Dose forms can be conveniently prepared by combining the composition of Compound A and levodopa with pharmaceutically known vehicles generally used in formulations. The composition can be prepared in a solid or liquid state by methods known in the pharmaceutical arts for oral, parenteral, intramuscular, subcutaneous and intravenous administration.

DESCRIPTION OF THE PREFERRED EMBODIMENTS

The activity of 1-(2-pyridyl)piperazine (Compound A) and of the composition of Compound A and levodopa in suppressing tremor symptomatic of parkinsonism was assessed in tremorine-induced parkinsonism in mice. Tremorine is 1,1'-(2-butynylene)dipyrrolidine and may be synthesized according to the method by Biel and DiPierro in J. Am. Chem. Soc. 80: 4609 (1958). Utilization of tremorine to produce experimental parkinsonism has been reported by Everett et al. in Science, 124:79 (1956).

The activity of Compound A was compared to known reference compounds atropine sulfate, trihexyphenidyl hydrochloride, and levodopa. Graded doses of these compounds were administered orally to groups of 10 mice 15 minutes before intraperitoneal injection of tremorine at a dose of 20 mg./kg. which causes severe tremor in unprotected mice. Tremor was determined 30 minutes after administration of tremorine. Animals which did not show tremor of the head during a 1 minute observation period were considered protected. The proportion of mice protected at each dose level of Compound A and the reference compounds was used to estimate the $ED_{50}$ (median effective dose) and the $Cl_{95}$ (confidence limits for 95% protection) for the respective compounds. The results are tabulated in Table I.

TABLE I

| Compound | $ED_{50}$ (mg./kg., p.o.) | $CL_{95}$ (mg./kg., p.o.) | N (number of mice) |
| --- | --- | --- | --- |
| Compound A | 2.6 | 1.4–4.9 | 60 |
| Atropine | 8.4 | 5.6–12.6 | 50 |
| Trihexyphenidyl | 7.0 | 4.2–11.5 | 50 |
| Levodopa | 375.0 | 279.8–502.5 | 50 |

Because the pharmacological effects of tremorine can be completely prevented by compounds which merely inhibit its biotransformation to oxotremorine, the active metabolite, the anti-tremor activity of Compound A was also assessed using oxotremorine. This test was performed essentially as described above, except for the fact that oxotremorine (1 mg./kg., i.p.) was injected 30 min. after oral administration of the test drug, and evaluation of tremor was carried out 15 min. after injection of oxotremorine. Compound A suppressed oxotremorine-induced tremor in a dose-response fashion. The $ED_{50}$ and 95% confidence limits for compound A were 3.0 (1.3–7.2) mg./kg.

The $LD_{50}$ of compound A in mice is 147 mg./kg.

The antitremor activity of the composition of Compound A and levodopa was assesed by its ability to suppress tremorine-induced experimental parkinsonism in mice and was compared to levodopa alone. In a first series of experiments groups of 10 mice were given a fixed, relatively ineffective amount of Compound A (0.31 mg./kg.) together with doses of levodopa ranging from 25 to 400 mg./kg. In a second group of experiments animals received a fixed, relatively ineffective amount of levodopa (100 mg./kg.) together with doses of Compound A ranging from 0.31 to 5.00 mg./kg. In all experiments compositions of the present invention and levodopa were administered orally fifteen minutes before the intraperitoneal injection of tremorine (20 mg./kg.). Tremorine effects were evaluated as described above. The results are presented in Tables II and III.

TABLE II

| Drug | $ED_{50}$ (mg./kg., p.o.) | $CL_{95}$ |
|---|---|---|
| Levodopa | 370.0 | 269.0–509.0 |
| Compound A | 2.6 | 1.4–4.9 |
| Levodopa plus Compound A (0.31 mg./kg.) | 66.0 | 41.8–104.3 |

TABLE III
[Dose, mg./kg., p.o.]

| Compound A | Levodopa | Ratio | Percent protected |
|---|---|---|---|
|  | 100.0 |  | 10 |
| 0.31 | 100.0 | 1:320 | 20 |
| 0.62 | 100.0 | 1:160 | 50 |
| 1.25 | 100.0 | 1:80 | 70 |
| 2.50 | 100.0 | 1:40 | 80 |
| 5.00 | 100.0 | 1:20 | 90 |

What is claimed is:

1. A composition for suppressing tremor symptomatic of parkinsonism which comprises:
   (a) a compound selected from the group consisting of 1-(2-pyridyl)piperazine and a pharmaceutically acceptable acid addition salt thereof; and
   (b) levodopa;
wherein said compound and said levodopa are in a ratio of from 1:320 to 1:20 on a weight basis.

2. A composition as in claim 1, wherein said compound is 1-(2-pyridyl)piperazine dihydrochloride.

3. A composition as in claim 1 wherein said ratio is 1:320.

4. A composition as in claim 1 wherein said ratio is 1:160.

5. A composition as in claim 1 wherein said ratio is 7:80.

6. A composition as in claim 1 wherein said ratio is 1:40.

7. A composition as in claim 1 wherein said ratio is 1:20.

8. A method of suppressing tremor symptomatic of parkinsonism which comprises administering to a mammal having said tremors an effective amount of:
   (a) a compound selected from the group consisting essentially of 1-(2-pyridyl)piperazine and pharmaceutically acceptable acid addition salts thereof; and
   (b) levodopa;
wherein said compound and said levodopa are in a ratio of from 1:320 to 1:20 on a weight basis.

9. A method as in claim 8 wherein said ratio is 1:320.

10. A method as in claim 8 wherein said ratio is 1:160.

11. A method as in claim 8 wherein said ratio is 1:80.

12. A method as in claim 8 wherein said ratio is 1:40.

13. A method as in claim 8 wherein said ratio is 1:20.

14. A method as in claim 8 wherein said amount ranges from 5 mg./kg./day to 20 mg./kg./day.

15. A method as in claim 8 wherein said compound and said levodopa is administered orally.

16. A method as in claim 8 wherein said compound is 1-(2-pyridyl)piperazine dihydrochloride.

17. A method of supressing tremor symptomatic of parkinsonism which comprises administering to a mammal having said tremors an effective amount of:
   (a) from 0.31 mg./kg. to 5.00 mg./kg. of a compound selected from the group consisting of 1-(2-pyridyl)piperazine and a pharmacologically acceptable acid addition salt thereof; and
   (b) 100 mg./kg. of levodopa.

References Cited

UNITED STATES PATENTS 2,606,906  8/1952  Hultquist _____ 260—288
2,958,694  11/1960  Janssen _____ 424—250

STANLEY J. FRIEDMAN, Primary Examiner

U.S. Cl. X.R.

424—319